United States Patent Office 3,432,489
Patented Mar. 11, 1969

3,432,489
DISACCHARIDE POLYSULFATE ALUMINIUM COMPOUND AND METHOD
Yoshihiro Nitta, Komae-machi, Masaya Namekata, Kawasaki-shi, Eiichi Tomita, Kodaira-shi, Tokyo, and Yusaku Hirota, Mitaka-shi, Tokyo, Japan, assignors to Chugai Seiyaku K.K., Tokyo, Japan, a corporation of Japan
No Drawing. Filed Oct. 25, 1966, Ser. No. 589,242
Claims priority, application Japan, Nov. 5, 1965,
40/67,508
U.S. Cl. 260—234
Int. Cl. C07c 47/18; C07f 5/06; A61k 27/00
8 Claims

ABSTRACT OF THE DISCLOSURE

New compounds having peptic ulcer inhibiting action and no side effects are produced by reacting aluminium ion with a disaccharide polysulfate or its salt to produce a disaccharide polysulfate-aluminium compound containing 7–13% sulphur and 11–24% aluminium per molecule.

---

This invention relates to disaccharide polysulfate-aluminium compounds, their preparation, composition containing such compounds/and uses thereof.

It has been known that the compounds such as polysaccharide polysulfate, disaccharide polysulfate and aluminium hydroxide have peptic ulcer inhibiting activity. In addition, polysaccharide polysulfate has blood anticoagulant activity as a side effect, so that it cannot be used on patients bleeding from ulcer; therefore, such compound can hardly be provided as a peptic ulcer treating agent. On the other hand, disccharide polysulfate and aluminium hydroxide are not suitable ulcer treating agents because their activity is weak and also because in the former there is fear of side effects to its high absorption.

An object of this invention is to provide new compounds having peptic ulcer inhibiting action and no side effects.

A further object of this invention is to provide a process for preparing new compounds.

Another object of this invention is to provide a composition containing the new compound, and still another object of this invention is to provide a method treating peptic ulcer using the new compound.

It is another object of the present invention to inhibit and treat peptic ulcers.

These and other objects and the nature and advantages of the instant invention will be apparent from the following description.

The typical compounds of this invention are sucrose polysulfate-aluminium compounds, lactose polysulfate-aluminium compounds and maltose polysulfate-aluminium compounds, the S and Al contents of which are 7–13% and 11–24%, respectively, and which, therefore, generally contain 1–4 aluminium atoms per sulfur atom.

The exact formula of the compounds of this invention have not been precisely determined, but it is clear that the products of this invention are not mixtures, but compounds because of the facts:

(1) That the obtained disaccharide polysulfate-aluminium compounds of this invention are water insoluble white powders in spite of the fact that the raw materials, (a) disaccharide polysulfate or its metal salts and, (b) the solution containing aluminium ions, are easily soluble in water; and (2) That the calcium ion is not found in disaccharide polysulfate-aluminium compounds which are obtained by the reaction of, (a) disaccharide polysulfate-calcium salt with (b) aluminium ion.

According to this invention, such disaccharide polysulfate-aluminium compounds are prepared by reacting aluminium ion with disaccharide polysulfate or its salt, and in the reaction "aluminium ion" represents various aluminium ions which may be prepared by reacting an acid with metal aluminium or aluminium hydroxide or by reacting an alkali with aluminium chloride; the aluminium ion is generally brought into the reaction as a solution mainly containing $Al^{+++}$, $Al(OH)^{++}$, $Al(OH)_2^+$ and the like, which may be advantageously prepared by reacting hydrochloric acid with metal aluminium or aluminium hydroxide or by reacting caustic soda with aluminium chloride.

Of the solutions containing such aluminium ions, the most suitable one is the solution containing aluminium ion and chlor-ion in the ratio 1:1, e.g., the solution mainly containing aluminium dihydroxychloride, and it is most preferable to obtain such a solution by reacting an equimolar amount of hydrochloric acid with aluminium metal.

Further, the concentration of this solution gives crystals mainly containing aluminium dihydroxychloride and an aqueous solution thereof may be also used as the "aluminium ion."

The reaction is generally carried out by mixing 1–10% aqueous solution of a disaccharide polysulfate or its salt and 1–10% aqueous solution of aluminium ion, preferably of aluminium dihydroxychloride under stirring at room temperature. The pH of the reaction solution is preferably between 3.5–5.5, especially 4–4.5. The pH may be controlled, where necessary, by the addition of an acid or an alkali which does not inhibit the reaction. It is very convenient to use solutions of aluminium ion and disaccharide polysulfate which have been each previously provided with a pH so that on mixing will be between 3.5 and 5.5. When aluminium chloride is used, caustic soda may be added after mixing the aqueous solution of aluminium chloride and disaccharide polysulfate solution.

The reaction proceeds for the most part without further processing merely by mixing disaccharide polysulfate solution and the aluminium ion solution or by adding caustic soda in the case where an aqueous solution of aluminium chloride is used.

However, to complete the reaction and to increase the yield, it is preferable to continue stirring further for about 30 minutes at room temperature.

The disaccharide polysulfate-aluminium compounds deposit as a white precipitate. If the concentration of the two raw solutions is above 20% or if the pH of the reaction solution is not being 3.5 and 5.5, there is difficulty in obtaining the deposition of the crystals. That is, white crystals will be hardly deposited when the concentration of the raw solutions, disaccharide polysulfate solution and aluminium ion solution, is above 20%. In such a case, the deposition will be accelerated by the addition of water. And, when the pH of the reacted solution is below 3.5, the yield will be decreased and when the pH of the reaction solution is above 5.5, the precipitation of aluminium hydroxide will be accompanied on crystallization.

The raw materials, disaccharide polysulfates, may be prepared, for example, by reacting a sulfating agent, such as chlorsulfonic acid, anhydrous sulfuric acid or sulfur trioxide-pyridine complex, with a disaccharide such as sucrose, lactose, maltose or the like in a solvent such as pyridine, formamide, dimethyl formamide, chloroform or liquid sulfur dioxide; and in general, the disaccharide polysulfates are used in the form of metal salt such as sodium-, potassium-, calcium-, magnesium-, barium-salt or the like. The sulfur content of these disaccharide polysulfates is generally about 10–21% as sodium salt, and above all, it is preferable to use the one, the sulfur content of which is 12–21% per one molecule in the reaction with aluminium ion.

As mentioned above, the raw material disaccharide polysulfate may be used as the solution which is prepared by dissolving previously prepared crystals in water, or as the reaction solution which is prepared directly from the disaccharide. Industrially, the latter case is very convenient because the formed reaction solution may be directly applied with the subsequent reaction with aluminium ion.

In the process, the preparation of disaccharide polysulfate from disaccharide may be carried out by such a general method as mentioned above, and above all, the method using pyridine-$SO_3$ complex is most suitable from the point of yield and reactability.

The preparation of disaccharide polysulfate from disaccharide in this process may be carried out by such a general method as mentioned above and the method using pyridine-$SO_3$ complex, above all, is most suitable in yield and reactability. According to this method, disaccharide polysulfate solution may be prepared by sulfating disaccharide with pyridine-$SO_3$ complex, which is prepared by dropping liquid $SO_3$ in dry pyridine at 0–5° C. The disaccharide polysulfate is then obtained by adding the polysaccharide to the pyridine-$SO_3$ complex at 50–70° C. for 3–5 hours. In the step, the acidity of the reaction solution is so strong as not to be suitable for the subsequent reaction with aluminium ion, so that the solution is applied to the subsequent process after neutralization with an alkali.

Neutralization may be carried out with sodium hydroxide, barium hydroxide, magnesium hydroxide or the like and is generally and mainly carried out with sodium hydroxide and calcium hydroxide because of ready availability and cheaper cost.

In this reaction, though the greater part of pyridine is generally removed before neutralization by decantation, a small amount of pyridine may still remain in the reaction solution, and since the remaining pyridine often gives so fine crystals that the recovery is difficult, it is preferable to remove this addition small amount of pyridine by concentration after neutralization and then to apply the subsequent reaction with aluminium ion.

Thus obtained disaccharide polysulfates contain about 7–21% of sulfur per molecule as Na-salt and they are directly applied to the subsequent reaction with aluminium ion without recovering.

After reaction with the aluminium ion, the formed disaccharide polysulfoate-aluminium compounds contain 7–13% sulfur and 11–24% aluminium per molecule.

The following specific examples are illustrative only and should not be construed as limiting the scope of the invention:

EXAMPLE 1

The content of aluminium in the final products, disaccharide polysulfate-aluminium compounds, depends upon the amount of aluminium ion used in the reaction and it is also affected by the kind of alkali used for neutralization of disaccharide polysulfate. For example, the results which were obtained by (1) dropping 19 g. of liquid $SO_3$ in 50 ml. of pyridine at 0° C., (2) adding 5 g. of sucrose to thus obtained pyridine-$SO_3$ complex solution, (3) reacting the mixture at 65° C. for 5 hours, (4) removing pyridine from thus obtained sucrose polysulfate solution, (5) adding a solution mainly containing aluminium dihydroxychloride, which was separately prepared by (a) dissolving metal aluminium with equimolar amount of conc. hydrochloric acid and (b) diluting the solution with twice the volume of water as that of the neutralized solution, and (6) reacting at room temperature for 30 minutes, are as follows:

TABLE I
[When calcium hydroxide was used]

| Al-ion used (mole) | Yield (g.) | Al (Percent) | S (Percent) | Al/S |
|---|---|---|---|---|
| 1 | | No crystals deposited | | |
| 2 | 2.9 | 16.65 | 11.90 | 1.7 |
| 3 | 3.3 | 16.82 | 11.01 | 1.8 |
| 4 | 5.0 | 17.99 | 9.76 | 2.2 |
| 5 | 6.1 | 18.05 | 9.24 | 2.3 |
| 6 | 6.6 | 18.61 | 8.99 | 2.5 |
| 7 | (a) | | | |
| 8 | (a) | | | | a Sticky substance.

TABLE II
[When sodium hydroxide was used]

| Al-ion used (mole) | Yield (g.) | Al (Percent) | S (Percent) | A/S |
|---|---|---|---|---|
| 1 | | No crystals deposited | | |
| 2 | 4.5 | 19.02 | 9.89 | 2.3 |
| 3 | 8.0 | 23.12 | 9.26 | 3.0 |
| 4 | 10.5 | 23.35 | 8.98 | 3.1 |
| 5 | 12.0 | 23.67 | 8.90 | 3.2 |
| 6 | 15.0 | 23.87 | 8.80 | 3.2 |
| 7 | (a) | | | | a Sticky substance.

As is clear from the above Tables I and II, the increase of amount of aluminium ion used tends to give higher aluminium content and higher yield; and in the method using NaOH for neutralization the aluminium content, yield and Al/S ratio are higher compared to the method using calcium hydroxide.

EXAMPLE 2

The most suitable mode of the process in this invention is as follows:

A disaccharide is added to the pyridine-$SO_3$ complex solution, which is prepared by reacting 5–6 times the molar amount of liquid $SO_3$ as much as that of disaccharide with 5–10 times the amount of pyridine as that of the disaccharide at 0–5° C., for sulfation at 50–70° C. for 3–7 hours. After the completion of sulfation, the greater part of pyridine is removed by decantation. The obtained solution exhibits an acidity that is so strong that it is improper to apply the reaction with aluminium ion and, therefore, sodium hydroxide is added for neutralization. After the remaining pyridine is removed by concentration, 100 unit volumes of water per unit volume of the residue is added thereto. To the solution is then added aluminium ion solution mainly containing aluminium dihydroxychloride, the pH of which is 1.0–1.2, in such an amount that the aluminium ion is present in an amount of 4–6 molar parts of the amount of disaccharide to provide a pH of 4–4.5. The mixture is reacted under stirring at room temperature and the formed disaccharide polysulfate-aluminium compound is allowed to precipitate. After filtration, the residue is washed with water and dried.

The thus obtained disaccharide polysulfate-aluminium compounds are hardly absorbed in the digestive tract and tend to prevent the development of ulcer in cases where it is administered to rats in the amount at which disaccharide polysulfate and aluminium hydroxide are not able to prevent the development of ulcers.

The toxicity of the compounds of this invention are very slight comparing corresponding disaccharide polysulfate (Na-salt) and, therefore, the compounds of this invention are more effective peptic ulcer treating agents.

The dosage of these compounds to human beings is preferably between 2 and 12 g. per day and the amount is preferably administered divided into several doses.

The compounds of this invention are generally formulated and associated with suitable and conventional pharmaceutical carriers or excipients and since the compounds are water insoluble the compounds are generally formulated into a dosage form as dust, granule, tablet or capsule or emulsion according to circumstances. The compounds are preferably presented in the form of dosage units, each dosage unit being adapted to supply a single dose of active ingredient, and preferably containing between 500–1000 mg. of a compound of this invention along with the carrier or excipient.

The pharmaceutical experiments of sucrose polysulfate-aluminium compound are shown as an example as follows:

EXAMPLE 3

Test 1.—Inhibition of Shay rat ulcer

Donryu strain male rats, weighing 170–250 g., whose pylorus was ligated according to Shay's method, were administered orally with sodium salt of sucrose polysulfate and sucrose polysulfate-aluminium compound (mentioned below as Su-S-Na and Su-S-Al respectively), polysaccharide polysulfate and the other ulcer inhibiting agents. 18 hours later, they were laparotomised under anesthesia to exerdise the stomach. The stomachs thus excised were incised at the greater curvature and examined macroscopically for the number and size of ulcerations in the gastric mucosa.

The gastric juice was taken into a graduated test tube and served as a sample for the examination of gastric juice.

TABLE III

| Sample | Dose (mg.) | Number of animals developing ulcer/group | Gastric juice analysis | |
|---|---|---|---|---|
| | | | pH | Pepsin activity [a] (mg.-tyrosine) |
| Su-S-Na(S: 13.2%) | 100 | 5/5 | 1.98 | 22.4 |
| Su-S-Al(S: 9.3%)(Al: 15.8%) | 100 | 0/5 | 3.69 | 9.6 |
| Do | 50 | 1/5 | 3.38 | 11.2 |
| Su-S-Na(S: 16.8%) | 50 | 2/5 | 1.80 | 8.2 |
| Do | 30 | 5/5 | 1.69 | 12.0 |
| Su-S-Al(S: 8.4%)(Al: 18.7%) | 50 | 0/5 | 3.54 | 5.1 |
| Do | 30 | 0/5 | 2.78 | 9.6 |
| Control | | 5/5 | 1.28 | 22.3 |
| Su-S-Na(S: 13.2%) [b] | 100 | 5/5 | 2.08 | 20.1 |
| Al(OH)₃ [b] | 50 | | | |
| Heparin | 30 | 3/5 | 1.41 | 16.5 |
| Chondroitin sulfuric acid | 30 | 5/5 | 1.1 | 25.8 |
| Dextran sulfate | 30 | 1/5 | 1.3 | 9.6 |
| Oxidized starch sulfate | 30 | 0/5 | 1.9 | 3.0 |
| Vitamine U | 50 | 5/5 | 1.3 | 21.9 |
| Al(OH)₃ | 50 | 7/9 | 3.8 | 17.9 |
| Extracts of glycyrrhizae crudum | 50 | 5/5 | 2.9 | 19.8 |
| Bithmuth subnitrate | 300 | 5/5 | 1.7 | 19.5 |
| Glutamate | 300 | 5/5 | 1.9 | 19.2 |
| Ebimar [c] | 100 | 2/5 | 1.5 | 15.5 |

[a] Pepsin activity is shown by "mg.-tyrosine," which is the amount (mg.) of tyrosine formed by the enzymic reaction of pepsin from serum protein.
[b] Su-S-Na and Al (OH)³ was simultaneously administered.
[c] Partial hydrolysis product of Carrageenin.

As clear from the above Table III, Su-S-Al was found to have more powerful effect than Su-S-Na. Su-S-Al, administered in a 30 mg. dose gave results which were not inferior to those with polysaccharide sulfates, suppressing completely the development of ulcer. It also becomes apparent from the table that among the other preparations currently on the market only aluminium hydroxide and Ebimar were somewhat effective but to a much less extent than Su-S-Al.

Test 2.—Effect on histamine-induced ulcer in guinea pig

In conformity with the method used by W. Anderson et al. in the study of Ebimar, 200 or 400 mg. Su-S-Al was administered to guinea pigs at 3 hour intervals from 6 hours before to 18 hours after histamine administration. The animals were sacrified 24 hours following the administration of histamine; the stomach and duodenum were excised and examined macroscopically for ulceration.

TABLE IV

| Ulcer Group | Dose (mg.) | No. of animals developing ulcer | | Note |
|---|---|---|---|---|
| | | Gastric | Duodenal | |
| 9 animals: Control | | 8/8 | 5/8 | One died after administration of histamine. |
| 8 animals: | | | | |
| Su-S-Al(S: 8.61%)(Al: 14.2%) | 400 | 2/7 | 0/7 | Do. |
| Do | 200 | 3/8 | 1/8 | No death after administration of histamine. |
| Su-S-Al(S: 10.08%)(Al: 20.09%) | 400 | 1/6 | 0/6 | Two died after administration of histamine. |
| Do | 200 | 3/7 | 0/7 | One died after administration of histamine. |
| Su-S-Al(S: 9.89%)(Al: 23.35%) | 400 | 2/7 | 0/7 | Do. |
| Do | 200 | 3/7 | 0/7 | Do. |

As apparent in Table IV, all the animals of the control group developed gastric ulcer, and duodenal ulcers were recognized in 5 of the 8 animals. On the contrary, in the group receiving 400 mg. Su-S-Al (S content 10.08%, Al content 20.09%) (4 g. total), gastric ulcers were recognized in only one out of the six, and no duodenal ulcers were found. In the group treated wtih 200 mg. of the drug, gastric ulcers were seen in 3 of the 7 animals, but duodenal ulcer was not recognized throughout the cases, with erosion of the duodenal mucosa noted on only one occasion.

Test 3.—Influence upon pH and acidity of gastric juice

Su-S-Al (S: 10.05%, Al: 18.6%) and Su-S-Na (S: 15.96%) were adminstered orally to Shay rats and 18 hours later the gastric juice was taken to compare their effects on its pH and acidity.

TABLE V

| | Total acidity (m. eq./l.) | Free HCl (m. eq./l.) | pH |
|---|---|---|---|
| Su-S-Na(S: 15.96%) | 67.1 | 41.5 | 1.8 |
| Su-S-Al(S: 10.05%) (Al: 18.6%) | 55.4 | 17.9 | 3.0 |
| Control | 74.6 | 51.1 | 1.4 |

As clear from the above table, alterations neither in pH nor in acidity were recognized in animals receiving Su-S-Na and of the control group (receiving water), while in the group treated with Su-S-Al a decrease in pH and acidity was seen, indicating the excellent antacid effect of the drug.

Test 4.—Influence on blood coagulation

After administration of 0.5 g./kg. (1.5 g./day/animal) Su-S-Al (S: 10.17%, Al: 18.99%) for 14 consecutive days in rabbits, the blood was drawn from their auriculture vein, subjected to recalcification, prothrombin, thrombotest, as well as thromboplastin generation test, and the values obtained were compared with the pre-treatment values. As shown in Table VI, the values following medication were substantially the same as those prior to the medication without any significant reduction noted in blood coagulability.

TABLE VI

| Rabbit No. | Recalcification times | Prothrombin time | Thrombo- test | Thromboplastin generation test |
|---|---|---|---|---|
| No. 1 {Before | 3′13″ | 6″ | | 1′03″, 20″, 20″. |
| 14th day | 2′20″ | 5.5″ | | 51″, 20″, 20″. |
| No. 2 {Before | 2′02″ | 5″ | | 1′20″, 40″, 20″. |
| 14th day | 1′51″ | 5″ | | 1′20″, 20″, 20″. |
| No. 3 {Before | 2′40″ | 5.5″ | | 55″, 13″, 13″. |
| 14th day | 2′45″ | 5.5″ | | 42″, 15″, 15″. |

Test 5

The absorption of Su-S-Al (S: 10.25%, Al: 18.21%) from the digestive tract was estimated by determining the amount of Su-S-Na in the urine and feces after oral administration of 300, 100 and 50 mg.

As the result of this test, it was revealed that 1.5% of the dose was excreted in urine and 90% was recovered in feces. From this it may be presumed that less than 10%, at most, of Su-S-Al administered is absorbed from the digestive tract.

Test 6.—Toxicity

Su-S-Al (S: 10.25%, Al: 18.21%) was orally administered to ddY-strain male mouse to determine acute toxicity. Acute toxicity, $LD_{50}$ of the compound was more than 12 g./kg.

Further, Donryu-strain male rats were given oral medication of Su-S-Al (S: 10.25%, Al:18.21%) in doses of 1, 2, and 4 g./kg. daily over 6 months, during which period the body weight and food intake of the animals were determined every day. At the end of the treatment they were autopsied and examined both macroscopically and microscopically for principal organs. The blood picture was also investigated. No remarkable changes, as compared with the control, were found.

Test 7.—Clinical evaluation

Eleven patients having a definite diagnosis of peptic ulcer by X-ray or gastroscope examination, 7 gastric ulcer and 4 duodenal ulcer patients, were given oral medication of Su-S-Al (S: 10.25%, Al: 18.21%) at the dose of 6 g. per day after meal divided into 3 doses, and then the subjective sympton, evidence of ulcer by X-ray and gastroscope examination and bleeding tendency were observed.

(A) Curing effect.—Subjective symptoms in all the cases were reduced. At 11–20 days after the beginning of administration, all the 7 patients of gastric ulcer were examined by X-ray and gastroscope, and the curing effect was observed in all the cases.

Four duodenal ulcer patients were also examined by X-ray, as well, at 13–42 days after the beginning of administration. Improvement of deformity was observed in two cases and they were judged to be completely cured. In the other two cases, the deformity was still observed but they seemed to be completely cured.

(B) Influence on bleeding time.—In all elevent patients of peptic ulcer, no remarkable bleeding was observed. No acceleration of bleeding from ulcer was observed in all the cases, and the peptic ulcer seemed to be completely cured.

EXAMPLE 4

10 g. of sodium salt of sucrose polysulfate (S content 11.74%) was dissolved in 200 ml. of water and the solution, which was separately prepared by dissolving 6 g. of aluminium dihydroxychloride, which was obtained by treating 1 mole of metal aluminium with 1 mole of hydrochloric acid, in 100 ml. of water was added thereto little by little under stirring. By the step, white powder was gradually formed. Then, the pH of the solution was controlled between 4.5 and 5.0 by the addition of 1 N NaOH solution and the reaction was carried out at room temperature for about 30 minutes under stirring. The formed white precipitate was separated by filtration and the precipitate was washed with water to remove unreacted sucrose polysulfate, further washed with methanol and dried. Yield. 17.2 g.; S content 8.61%; Al content 14.2%.

The compound was orally administered to male rats weighing about 170 g. whose pylori were ligated at the dose of 50 mg. respectively and complete inhibitory action on development of experimental peptic ulcer was observed.

EXAMPLE 5

20 g. of calcium salt of lactose polysulfate (S content 15.26%) was dissolved in 100 ml. of water and 100 ml. of 20% aqueous solution of aluminium dihydroxychloride, which was prepared by treating 1 mole of aluminium with 1 mole of hydrochloric acid, was added thereto under stirring, and the mixture was stirred for a while. Then, 1–2 liters of distilled water was added gradually to give the white deposition of lactose polysulfate-aluminium compound. The deposit was filtered and the residue was washed with water several times to remove unreacted lactose polysulfate and aluminium dihydroxychloride and further washed with methanol and dried. Yield 24.5 g.; S content 10.17%; Al content 16.1%.

The compound was orally administered to male rats weighing about 210 g. whose pylori were ligated at the dose of 50–70 mg. respectively and complete inhibitory action on development of experimental peptic ulcer was observed.

EXAMPLE 6

To 150 ml. of 3% aqueous solution of maltose polysulfate sodium salt (S content 15.10%) was added 100 ml. of 5% aqueous solution of aluminium dihydroxychloride, which was prepared by the same manner as in Example 5, under stirring to give white turbidity. After stirring for a while, the formed white precipitation was separated by filtration, the residue was washed with water several times and further washed with methanol and dried. Yield 5.2 g.; S content 9.55%; Al content 15.7%.

The compound was orally administered to rats weighing about 180–200 g. whose pylori were ligated at the dose of 30 mg. respectively and complete inhibitory action on development of experimental peptic ulcer was observed.

EXAMPLE 7

10 g. of sodium salt of sucrose polysulfate (S content 15.62%) was dissolved in 200 ml. of water and 100 ml. of the aluminium solution which was separately prepared by dissolving 6 g. of the product, which was obtained by treating 1 mole of metal aluminium with 1 mole of hydrochloric acid, in water to make 100 ml., was added thereto little by little under stirring. By the step, white powdery precipitation was deposited gradually. The pH of the reaction solution was about 3.6. Then, the pH of the solution was controlled between 4.5–5.0 by the addition of 1 N NaOH and the reaction was carried out under stirring for about 30 minutes at room temperature. The formed white precipitation was separated by filtration, the residue was washed with water to remove unreacted sucrose polysulfate sodium salt and further washed with methanol. 15.2 g. of sucrose polysulfate-aluminium compound was obtained. S content 11.2%; Al content 14.2%.

The compound was orally administered to rats weighing about 170 g. whose pylori were ligated at the dose of 50 mg. respectively and complete inhibitory action on development of experimental peptic ulcer was obsedved.

EXAMPLE 8

10 g. of calcium salt of lactose polysulfate (S content 15.12%) was dissolved in 600 ml. of water and the aluminium solution which was separately prepared by dissolving 14 g. of aluminium chloride in 600 ml. of water, was added under stirring thereto. The pH of the reaction solution was about 2.9. The pH of the solution was controlled at 4.1 by the addition of 4 N NaOH to give white precipitation of lactose polysulfate-aluminium compound. After stirring for 30 minutes at room temperature, the precipitation was separated by centrifugation and dried. 12.3 g. of lactose polysulfate-aluminium compound (S content 11.21%, Al content 13.7%) was obtained.

The compound was orally administered to rats weighing about 210 g. whose pylori were ligated at the dose of 50–70 mg. respectively and complete inhibitory action on development of experimental peptic ulcer was observed.

EXAMPLE 9

10 g. of sodium salt of maltose polysulfate (S content 16.22%) was dissolved in 400 ml. of water and the aluminium solution, which was separately prepared by dissolving 14 g. of the product which was obtained by treating 1 mole of aluminium hydroxide with 0.5 mole of hydrochloric acid in 500 ml. of water, was added little by little under stirring. The solution became immediately turbid and white precipitation of maltose polysulfate-aluminium compound was formed. The pH of the solution was 4.9. After stirring for 30 minutes at room temperature, the precipitate was separated by filtration and washed with water and dried. 17.2 g. of maltose polysulfate-aluminium compound was obtained having an S content of 11.35% and an Al content of 16.8%.

The compound war orally administered to rats weighing 180–200 g. whose pylori were ligated at the dose of 60–70 mg. respectively and complete inhibitory action on development of experimental peptic ulcer was observed.

EXAMPLE 10

The temperature of pyridine-$SO_3$ complex solution, which was prepared by dropping 7.3 ml. of liquid $SO_3$ (d.=1.922) at 0–5° C. for about 30–35 minutes in 100 ml. of dry-pyridine, was raised up to 45° C. and 10 g. of sucrose was added thereto. After the temperature was raised up to 65° C., the reaction solution was stirred for 4 hours at this temperature.

After the completion of the reaction, the reaction solution was cooled and then the greater part of pyridine was removed by decantation. The sticky residue was dissolved with about 200 ml. of water and the solution was neutralized with suspended solution of 4 g. of $Ca(OH)_2$ in 10 ml. of water. Then, excess of $Ca(OH)_2$ was treated with $CO_2$ for 1–2 hours, 2 g. of active carbon was added and the solution was subjected to filtration.

To the filtrate was added a small amount of $CaCO_3$, and the remaining pyridine was removed by concentration. $CaCO_3$ was removed by filtration and 200 ml. of 19% aluminium dihydrochloride solution, which was obtained by the same manner as in Example 5, was added to the filtrate. On mixing, the product was deposited. After the solution was stirred for about one hour, the product was obtained by filtration and was then washed with water several times and dried. Yield 42 g.; Al content 18.21%; S content 10.25%.

EXAMPLE 11

In the same manner in Example 10, NaOH solution was used in place of $Ca(OH)_2$ as the neutralizing agent to give 51 g. of sucrose polysulfate-aluminium compound, Al content 17.54%; S content 7.61%.

EXAMPLE 12

Pharmaceutical formation (1) Granular formation

| | Mg. |
|---|---|
| Sucrose polysulfate-aluminium compound | 750 |
| Corn starch | 244 |
| Methyl cellulose | 4 |
| 1-menthol | 2 |
| Sum | 1,000 |

The powdered sucrose polysulfate-aluminium compound was mixed with powdered corn starch. A binder of methylcellulose was prepared by dissolving 1-menthol in ethylalcohol, dispersing methylcellulose therein and adding water therein so as to make the content of alcohol 50%.

To the mixture of sucrose polysulfate-aluminium compound and corn starch was added the binder containing 1-menthol and the mixture was well kneaded. After kneading for a while, the mixture was formulated into granular by granulating machine and the granular was dried. The size thereof was 14–60 mesh.

(2) Tablet formation

| | Mg. |
|---|---|
| Sucrose polysulfate-aluminium compound | 500 |
| Lactose | 82 |
| Corn starch | 50 |
| Calciumcarboxymethylcellulose | 7.5 |
| Sodiumcarboxymethylcellulose | 0.5 |
| Magnesium stearate | 10 |
| Sum | 650 |

Sucrose polysulfate-aluminium compound, lactose and corn starch were mixed and sodium carboxymethylcellulose paste, which was previously prepared by swelling with ethylalcohol and dissolving in water, was added thereto. The mixture was kneaded and granulated. After drying, granular was admixed with calciumcarboxymethylcellulose and magnesium stearate.

Tablet weighing 650 mg. was formulated by tableting machine.

(3) Capsule formation

| | Mg. |
|---|---|
| Sucrose polysulfate-aluminium compound | 500 |
| Corn starch | 30 |
| Talc | 15 |
| Magnesium stearate | 5 |
| Sum | 550 |

Above four agents were mixed and filled in a gelatin capsule weighing 100 mg. Total weight is 650 mg.

It will be obvious to those skilled in the art that various changes may be made without departing from the scope of the invention and the invention is not to be considered limited to what is described in the specification.

What is claimed is:

1. A disaccharide polysulfate-aluminium compound containing 7–13% sulfur and 11–24% aluminium per molecule.

2. A disaccharide polysulfate-aluminium compound as claimed in claim 1, in which the disaccharide is selected from the group consisting of sucrose, lactose and maltose.

3. A process for preparing a disaccharide polysulfate-aluminium compound in accordance with claim 1 which comprises mixing 1–10% aluminium ion solution and 1–10% disaccharide polysulfate having an S content of 10–21% based on the Na-salt, reacting said mixture components under stirring at room temperature and at a pH between 3.5 and 5.5, and recovering the formed disaccharide polysulfate-aluminium compound.

4. A process claimed in claim 3, in which the aluminium ion solution is aluminium dihydroxychloride solution containing aluminium and chlorine in the ratio of 1:1.

5. A process for preparing a disaccharide polysulfate-aluminium compound in accordance with claim 1 which comprises reacting a disaccharide with a sulfating agent selected from the group consisting of chlorsulfonic acid, sulfuric anhydride and sulfur trioxide-pyridine complex in a solvent selected from the group consisting of pyridine, formamide, dimethyl formamide, chloroform and liquid sulfur dioxide; neutralizing the obtained disaccharide polysulfate solution with alkali; and reacting the neutralized disaccharide polysulfate solution with aluminium ion solution.

6. A process claimed in claim 5, in which the aluminium ion solution is a solution consisting essentially of aluminium dihydroxychloride which is prepared by reacting hydrochloric acid with a material selected from the group consisting of metal aluminium and aluminium hydroxide.

7. A process claimed in claim 5, in which the aluminium ion solution is the solution mainly containing aluminium dihydroxychloride which is prepared by reacting aluminium chloride with sodium hydroxide.

8. A process for preparing disaccharide polysulfate-aluminium compound according to claim 1 which comprises reacting 5-6 molar parts of liquid $SO_3$ with 5-10 molar parts of pyridine, adding 1 molar part of disaccharide to the resultant pyridine-$SO_3$ complex, reacting under stirring at 50-70° C. for about 3-7 hours, removing the greater part of pyridine by decantation, neutralizing the reaction mixture with an alkali selected from the group consisting of caustic soda and calcium hydroxide, removing any still remaining pyridine, adding 100 volumes of water per volume of remaining residue therein, further adding aluminium ion solution consisting essentially of aluminium dihydroxychloride the pH of which is 1.0–1.2 in such an amount that the aluminium ion is present in an amount of 4–6 times as much as that of disaccharide, reacting under stirring at room temperature at the pH 4–4.5, and recovering the formed precipitation.

References Cited

UNITED STATES PATENTS

| | | | |
|---|---|---|---|
| 2,755,275 | 7/1956 | Cushing et al. | 260—234 |
| 3,017,407 | 1/1962 | Petracek et al. | 260—234 |
| 3,057,855 | 10/1962 | Smith et al. | 260—234 |
| 3,075,965 | 1/1963 | Touey et al. | 260—234 |
| 3,198,332 | 8/1965 | Davison | 260—209 |
| 3,359,169 | 12/1967 | Slater et al. | |

LEWIS GOTTS, *Primary Examiner.*

J. R. BROWN, *Assistant Examiner.*

U.S. Cl. X.R.

260—209; 424—14, 180